United States Patent Office 3,600,441
Patented Aug. 17, 1971

3,600,441
PROCESS FOR THE PRODUCTION OF OXAMIDE
Theodor Lussling and Ferdinand Theissen, Grossauheim, and Wolfgang Weigert, Offenbach, Germany, assignors to Deutsche Gold- und Silber-Scheideansalt vormals Roessler, Frankfurt am Main, Germany
No Drawing. Filed Feb. 27, 1969, Ser. No. 803,065
Claims priority, application Germany, Mar. 2, 1968,
P 16 93 012.4
Int. Cl. C07c 97/00
U.S. Cl. 260—561
10 Claims

ABSTRACT OF THE DISCLOSURE

Oxamide is formed in good yields under anhydrous conditions employing (1) cyanogen, (2) a carboxylic acid and (3) a carboxylic acid halide or hydrogen halide. Preferably superatmospheric pressure is employed.

---

The present invention is directed to a process for the production of oxalic acid diamide (oxamide) from cyanogen (dicyanogen).

It is known to produce oxamide through ammonolysis of oxalic acid diesters (Liebigs Ann. Chem. 9 (1834), 12, 130) or dehydration of ammonium oxalate (Jour. Amer. Chem. Soc. 29 (1907) 1137). It is also known to obtain oxamide through various processes by the hydrolysis of cyanogen. This can result, for example, by the treatment with an aldehyde (Liebigs Ann. Chem. 113 (1860) 246) or with concentrated hydrochloric acid whereby ammonium oxalate is obtained as a by-product (Chem. Ber. 1 (1867) 66), see also Kirk-Othmer, Encyclopedia of Chemical Technology, 2nd edition, vol. 14, page 367. It is further known to cause the hydrolysis of cyanogen in the presence of concentrated hydrochloric acid and water, U.S. Pat. No. 1,194,354. According to these processes it is necessary to adhere to low temperatures in order to favor the change to oxamide and to suppress the side reaction to oxalic acid. Finally it is known to use for the hydrolysis of cyanogen to oxamide a reaction mixture containing 10 to 90 volume percent concentrated hydrochloric acid, 10 to 90 volume percent acetic acid and acetic anhydride and 5 to 50 volume percent water, U.S. Pat. No. 3,037,055. To obtain high yields, however, it is necessary to have a reaction period of several days. It can of course be shortened through the use of elevated pressure and temperature, but at elevated temperatures the side reaction forming oxalic acid is favored.

It has now been found that oxamide can be produced through saponification of cyanogen with acids, if necessary at elevated temperature and preferably at elevated pressure if one carries out the saponification in a water free (anhydrous) medium and uses as the acid one carboxylic acid or several carboxylic acids together with a carboxylic acid halide. Preferably the last is replaced partially or completely by a hydrogen halide and if necessary the carboxylic acid halide or anhydride which forms is converted either during or after the saponification into the corresponding carboxylic acid, carboxylic acid halide or hydrogen halide.

According to the process of the invention there is obtained oxamide in very pure, mostly even in analytically pure form. Since the process can be carried out not only in the formerly customary temperature range of 0 to 75° C. but also at higher temperatures, for example between about 20 and about 120° C., preferably between about 40 and about 100° C. only short reaction times are necessary for the obtaining of higher yields. In spite of this fact the undesired formation of oxalic acid is eliminated or occurs in only very minor amounts. Advantageously it is of importance to the process of the invention that cyanogen possesses a higher solubility in the anhydrous medium than in an aqueous one. Therefore more oxamide can be produced per unit of time in the same volume than with the previously known processes. Furthermore there is less corrosion by working in an anhydrous medium.

It is advantageous that the treatment according to the invention takes place at elevated pressure. In general a superatmospheric pressure of 1 to 50 atmospheres absolute is employed. However, should the treatment be undertaken at normal (atmospheric) pressure one proceeds suitably that the cyanogen is introduced into a saturated solution of hydrogen halide and a carboxylic acid held at a higher temperature. In this case it is advantageous to recycle the unchanged cyanogen, i.e. to again subject it to the saponification.

As carboxylic acids coming within the framework of the invention there are particularly appropriate those which are liquid under the conditions of reaction. Aliphatic carboxylic acids are preferred. Examples are propionic acid, butyric acid, isobutyric acid, valeric acid, caproic acid, enanthic acid, and the like or mixtures thereof. Acetic acid is especially preferable. The carboxylic acids can be used in amounts of about 50 to about 99% by weight, preferably about 75 to about 99% by weight based on the cyanogen to be converted.

Of the hydrogen halides hydrogen chloride is preferably employed. There can also be used hydrogen bromide for example. The hydrogen halide can be added in amounts of about 0.1 to about 20% by weight, preferably about 1 to 10% by weight, of the amount of carboxylic acid.

As carboxylic acids there can be used chlorides or bromides of the above named carboxylic acids, e.g. acetyl chloride, acetyl bromide, propionyl chloride, propionyl bromide, butyryl chloride and butyryl bromide. Acetyl chloride is preferably employed. The acyl halides are used in amounts corresponding to those specified above for the hydrogen halides.

By the process of the invention if a hydrogen halide is used there is formed the corresponding carboxylic acid halide. On the contrary if one uses a carxboxylic acid halide in place of the hydrogen halide there is formed the corresponding carboxylic anhydride. These byproducts can be converted in a simple manner through treatment with the equivalent amount of water into carboxylic acids and hydrogen halides or into the corresponding carboxylic acid halide and be used again in the process. This conversion can also be so undertaken according to another form of the process of the invention; that one so gradually feeds water during the saponification proportional to the forming byproducts, that free water is never present in the reaction mixture. It should be understood that it is also possible, for example, to isolate the carboxylic acid halide and to supply it for other uses.

The oxamide can be isolated from the reaction mixture in known manner. It is useful as an intermediate product for the synthesis of other compounds and can especially be used directly as fertilizer.

Unless otherwise indicated all parts and percentages are by weight.

EXAMPLE 1

An anhydrous acetic acid-hydrogen chloride mixture was produced from 79 grams concentrated hydrochloric acid (37%) and 274 grams of acetic anhydride. 19.4 grams of cyanogen at a pressure of 3.8 atmospheres absolute was reacted with this mixture at a maximum temperature of 61° C. The reaction time was 105 minutes. The crystallizing oxamide was filtered off, washed and dried. The yield of oxamide, that precipitated analytically pure amounted to 95.2% based on the added cyanogen.

EXAMPLE 2

After separation of the oxamide so much water was added to the reaction mixture obtained in Example 1 that the acetyl chloride formed was split into acetic acid hydrogen chloride so that there was formed an acetic acid-hydrogen chloride mixture analogous to that used for the reaction in Example 1. The mixture was reacted with cyanogen in the manner described in Example 1. The yields of oxamide and their purity in the two examples is identical.

EXAMPLE 3

120.1 grams of acetic acid and 52 grams of cyanogen were put in an autoclave and hydrogen chloride gas introduced into the mixture until a pressure of 5.7 atmospheres absolute was reached. In the course of the reaction the pressure dropped on account of the consumption of the hydrogen chloride. The pressure was maintained at 5.7 atmopsheres absolute by replenishing the hydrogen chloride. The reaction time amounted to 300 minutes. The temperature of the reaction mixture did not exceed 52° C. There was obtained oxamide as an analytically pure substance in a yield of 97.6% based on the added cyanogen. The acetyl chloride formed was removed from the reaction mixture by distillation.

EXAMPLE 4

An acetic acid-hydrogen chloride mixture was used as in Example 1 but at a temperature of up to 111° C. and a pressure of up to 5.5 atmospheres absolute. After 30 minutes the yield of oxamide amounted to 90.8%. The reaction mixture was again heated for 30 minutes to 111° C. after the separation of the oxamide. Thereby further oxamide was formed so that the yield based on the added cyanogen finally amounted to 96.2%. The product was analytically pure.

EXAMPLE 5

20.8 grams of cyanogen were heated at 80° C. and 3.3 atmospheres absolute with a mixture 240 grams acetic acid and 78.5 grams acetyl chloride. After a reaction time of 120 minutes the oxamide yield based on the added cyanogen amounted to 44%. The product was analytically pure.

EXAMPLE 6

Using the acetic acid-hydrogen chloride solution of Example 1 cyanogen was saponified at 5.5 atmospheres and a maximum temperature of 80° C. There were employed 326 grams of acetic acid, 29.6 grams of hydrogen chloride and 23 grams of cyanogen. The acetyl chloride formed in the reaction was continuously converted back into acetic acid and hydrogen chloride by spraying in the stoichiometric amount of water. The reaction time amounted to 90 minutes. The separated oxamide was filtered off, washed and dried. The yield of oxamide precipitated of analytical purity was 95% based on the added cyanogen.

EXAMPLE 7

4.7 grams of cyanogen was introduced into 150 ml. of a saponification solution of Example 1 during 60 minutes [1] at 50° C. After 120 minutes of reaction time the yield of oxamide based on the cyanogen absorbed amounted to 90%. The oxamide was analytically pure.

---

[1] At atmospheric pressure.

What is claimed is:

1. In a process for the production of oxamide by saponification of cyanogen the improvement comprising reacting cyanogen with a carboxylic acid and a halide of the group consisting of a hydrogen halide, a carboxylic acid halide and mixtures thereof under anhydrous conditions and separating the oxamide formed from the reaction mixture.

2. A process according to claim 1 wherein the carboxylic acid is a liquid alkanoic acid and the halogen atom of the halide is chlorine or bromine.

3. A process according to claim 2 wherein the carboxylic acid is selected from the group consisting of acetic acid, propionic acid and butyric acid.

4. A process according to claim 3 wherein the carboxylic acid is acetic acid.

5. A process according to claim 4 wherein the halogen of the halide is chlorine, the temperature of reaction is between 20 and 120° C. and the pressure is between 1 and 50 atmospheres absolute.

6. A process according to claim 5 wherein said halide is hydrogen chloride.

7. A process according to claim 6 wherein the temperature is between 40 and 100° C.

8. A process according to claim 1 wherein the temperature is between 20 and 120° C.

9. A process according to claim 8 wherein the pressure is between 1 and 50 atmospheres absolute.

10. A process according to claim 1 wherein the pressure is between 1 and 50 atmospheres absolute.

References Cited

FOREIGN PATENTS 685,576  4/1964  Canada _____ 260—561

LEWIS GOTTS, Primary Examiner

E. G. LOVE, Assistant Examiner